US012509581B2

United States Patent
Cammage et al.

(10) Patent No.: US 12,509,581 B2
(45) Date of Patent: Dec. 30, 2025

(54) PARTICLES OF POLYAMIDE POWDERS AND USE THEREOF IN POWDER AGGLOMERATION PROCESSES

(71) Applicant: Arkema France, Colombes (FR)

(72) Inventors: Geoffroy Cammage, Serquigny (FR); Arnaud Lemaitre, Serquigny (FR); Emilie-Marie Soares Latour, Serquigny (FR)

(73) Assignee: ARKEMA FRANCE, Puteaux (FR)

( * ) Notice: Subject to any disclaimer, the term of this patent is extended or adjusted under 35 U.S.C. 154(b) by 747 days.

(21) Appl. No.: 17/604,789

(22) PCT Filed: Apr. 16, 2020

(86) PCT No.: PCT/FR2020/000130
§ 371 (c)(1),
(2) Date: Oct. 19, 2021

(87) PCT Pub. No.: WO2020/212662
PCT Pub. Date: Oct. 22, 2020

(65) Prior Publication Data
US 2022/0213319 A1    Jul. 7, 2022

(30) Foreign Application Priority Data

Apr. 19, 2019  (FR) ...................................... 1904205

(51) Int. Cl.
*C08L 77/02*     (2006.01)
*B29C 64/153*    (2017.01)
(Continued)

(52) U.S. Cl.
CPC ............ *C08L 77/02* (2013.01); *B29C 64/153* (2017.08); *B33Y 10/00* (2014.12); *B33Y 70/10* (2020.01)

(58) Field of Classification Search
None
See application file for complete search history.

(56) References Cited

U.S. PATENT DOCUMENTS 3,657,194 A    4/1972  Biensan
4,694,063 A *  9/1987  Hilaire .................... C08L 77/02
                                                        528/323

(Continued)

FOREIGN PATENT DOCUMENTS

CN    102015842 A    4/2011
CN    102812089 A    12/2012
(Continued)

OTHER PUBLICATIONS

Material Data Sheet : Orgasol 2001 EXD NAT 1 (Nov. 2018) from Arkem. [online]. Retrieved on [May 14, 2024]. Retrieved from URL :<https://arkema.materialdatacenter.com/pds/en/us/orgasol2001exdnat1>. (Year: 2018).*

(Continued)

*Primary Examiner* — Sanza L. McClendon
(74) *Attorney, Agent, or Firm* — Boone IP Law

(57) ABSTRACT

The invention relates to a seeded particle of polyamide (PA) powder consisting of:
  a polyamide core with a D50 within the range from 15 to 60 μm, and
  a polyamide shell,
characterized in that the shell has an inherent viscosity in solution and a melting temperature which are respectively higher than those of the core.

21 Claims, 1 Drawing Sheet

(51) Int. Cl.
*B33Y 10/00* (2015.01)
*B33Y 70/10* (2020.01)

(56) References Cited

U.S. PATENT DOCUMENTS

| | | | |
|---|---|---|---|
| 9,382,420 B2* | 7/2016 | Diekmann | ............. C08J 7/0427 |
| 9,617,384 B2* | 4/2017 | Senff | ............. C08G 69/18 |
| 11,959,201 B2* | 4/2024 | Dolle | ............. D02G 3/40 |
| 2010/0098880 A1 | 4/2010 | Senff | |
| 2013/0183529 A1 | 7/2013 | Diekmann | |

FOREIGN PATENT DOCUMENTS

| | | | | |
|---|---|---|---|---|
| CN | 102863639 A | | 1/2013 | |
| CN | 104558592 A | | 4/2015 | |
| CN | 105694068 A | | 6/2016 | |
| EP | 1571173 A1 | * | 9/2005 | ............. B82Y 30/00 |
| FR | 2910907 A1 | | 7/2008 | |
| FR | 3119623 A1 | * | 8/2022 | ........... B29C 64/153 |
| GB | 1300958 A | | 12/1972 | |
| JP | H09228150 A | | 9/1997 | |
| JP | 7454566 B2 | * | 3/2024 | ............. C08F 287/00 |

OTHER PUBLICATIONS

Material Data Sheet: Orgasol 2002 D NAT 1 (Nov. 2018) from Arkem. [online]/ Retrieved on [May 14, 2024]. Retrieved from URL :<https://arkema.materialdatacenter.com/pds/en/us/orgasol2002dnat1>. (Year: 2018).*
Material Data Sheet : Orgasol 1002 D NAT 1 (Nov. 2018) from Arkem. [online]. Retrieved on [May 14, 2024]. Retrieved from URL :<https://https://hpp.arkema.com/assets/arkema/TDS_ORGASOL%C2%AE%201002%20D%20NAT%201_ARK-ORGASOL-1002-D-NAT-1-WW_en_WW.pdf>. (Year: 2018).*
Database WPI [online] XP002796349, 1997, Week 199745, vol. 1997, No. 45, AN 1997-486876, Thomson Scientific, London, GB.
International Search Report (PCT/ISA/210) with English translation and Written Opinion (PCT/ISA/237) mailed on Aug. 20, 2020, by the European Patent Office as the International Searching Authority for International Application No. PCT/EP2020/000130. (13 pages).
First Office Action (English translation only) mailed on Aug. 31, 2023, by the Chinese National Intellectual Property Administration Office for Chinese Application No. 202080036717.5, 11 pages.
Second Office Action (English translation only) mailed on Jul. 31, 2024, by the Chinese National Intellectual Property Administration Office for Chinese Application No. 2024073100010280, 9 pages.
Material Datasheet—ORGASOL 2002 D NAT 1, available from hpp.arkema.com, 2 pages.

* cited by examiner

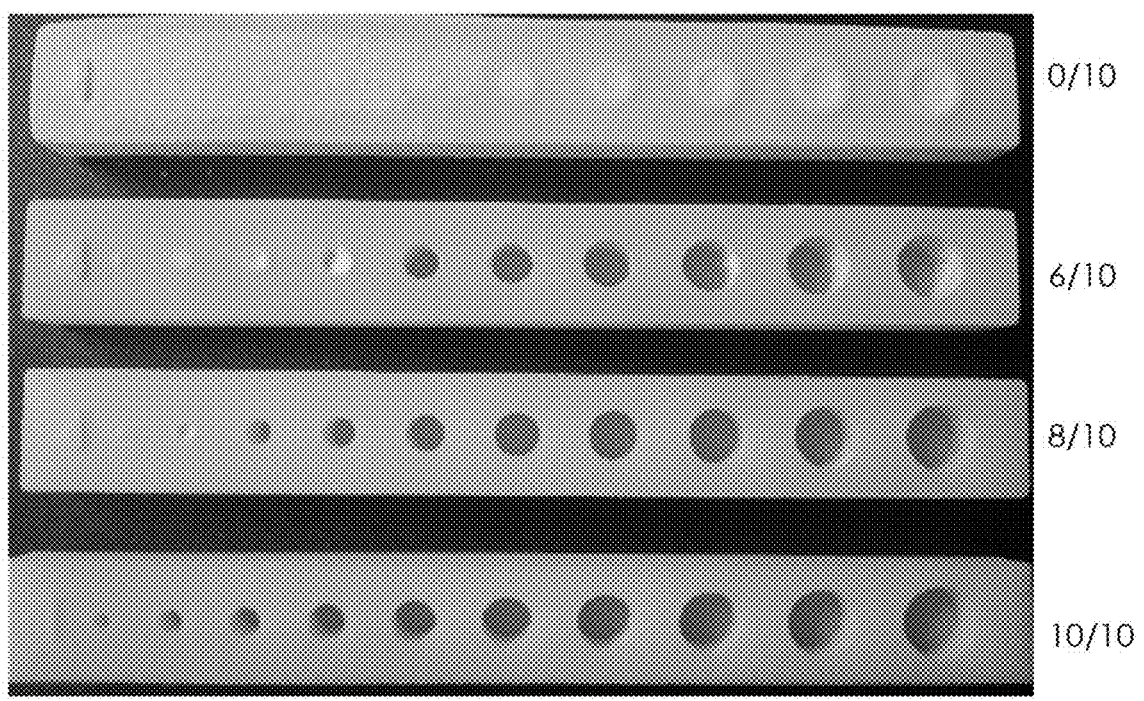

PARTICLES OF POLYAMIDE POWDERS AND USE THEREOF IN POWDER AGGLOMERATION PROCESSES

FIELD OF THE INVENTION

The present invention relates to seeded particles of polyamide powder, and to the use thereof in processes for the agglomeration of powder, layer by layer, by melting to manufacture three-dimensional objects which are easy to clean.

TECHNICAL BACKGROUND

The technology for agglomerating polyamide powders is used to manufacture three-dimensional objects, such as prototypes and models, in particular in the motor vehicle, nautical, aeronautical, aerospace, medical (prostheses, hearing systems, and the like), textile, clothing, fashion, decorative, electronic housing, telephony, home automation, computing and lighting fields. This technology also makes it possible to achieve fine and complex geometries, that are impossible to achieve by conventional molding techniques.

The agglomeration of powders by melting (hereinafter "sintering") is brought about by radiation, such as, for example, a laser beam (laser sintering), infrared radiation, UV radiation, or any source of electromagnetic radiation which makes it possible to melt the powder layer by layer in order to manufacture three-dimensional objects.

In the case of laser sintering, a thin layer of polyamide powder is deposited on a horizontal plate maintained in a chamber heated to a temperature lying between the crystallization temperature Tc and the melting temperature Tm of the polyamide powder. The laser makes it possible to fuse the powder particles at various points in the layer which crystallizes slowly after the passage of the laser in a geometry corresponding to the object, for example using a computer that stores the shape of the 3D object in memory and that reproduces this shape in the form of 2D slices. Subsequently, the horizontal plate is lowered by a value corresponding to the thickness of a powder layer (for example between 0.05 and 2 mm and generally of the order of 0.1 mm), and then a new powder layer is deposited and the laser makes it possible to fuse the powder particles according to a geometry corresponding to this new layer which crystallizes slowly according to a geometry corresponding to the object and so on. The procedure is repeated until the entire object has been manufactured. An object surrounded by powder is obtained inside the chamber. The parts which have not been agglomerated have therefore remained in the powder state. After complete cooling, the object is separated from the powder, which can be reused for another operation.

When the temperature of the powder in the machine comes too close to the melting temperature (Tm) of the powder, this leads to solidification around the parts ("caking" phenomenon), which manifests in the presence of undesired powder agglomerates at certain locations on the surface of the object, instead of having a good definition of the final object. At the end of construction, also referred to as a "run", it is thus necessary to undertake cleaning of the parts to remove this powder which has remained attached to the parts, before using them. This cleaning is generally done by sandblasting which can lead to the degradation of certain fine and/or fragile elements of the 3D parts constructed. Currently, no techniques other than cleaning the parts are known for remedying this problem. Nowadays, the ease of and the time for cleaning the parts are two significant factors in the overall manufacturing cost for all users of 3D machines. In the particular case of polyamide powders, certain grades take a particularly long time to clean. In addition, certain geometries are not accessible for cleaning, even though the manufacture of parts with complex and fine geometries is precisely the advantage provided by 3D construction.

SUMMARY OF THE INVENTION

The present invention arises from the unexpected demonstration by the inventors that seeded particles of polyamide powder of the core/shell type, formed of a polyamide shell with a high molar mass and a high melting temperature around a polyamide core, facilitate and/or reduce the time for cleaning the objects obtained by additive manufacturing (also known under the term 3D printing) from these powders. Advantageously, the inventors have also demonstrated that these polyamide powders are easily recyclable.

A subject of the present invention is therefore a seeded particle of polyamide (PA) powder consisting of:
  a polyamide core with a volume-median diameter D50 within the range from 15 to 60 µm, and
  a polyamide shell,
characterized in that the shell has an inherent viscosity in solution and a melting temperature which are respectively higher than or equal to those of the core.

The present invention also relates to a process for producing a polyamide powder particle as defined above by anionic polymerization in solution in a solvent, comprising the polymerization of the shell from 2-pyrrolidone (lactam 4), from caprolactam (lactam 6), from 2-azacyclononanone (lactam 8), from lauryllactam (lactam 12) or from a mixture thereof in the presence of a catalyst, of an activator, and of at least one amide chosen from N,N'-alkylenebisamides around a seed selected from the group consisting of PA4, PA6, PA8, PA11, PA12, PA6/12, PA6.12, PA6.13, PA6.10, PA6.6 and PA10.10 which will form the core of the particle.

The present invention also relates to a process for producing a powder particle according to the invention by dissolution of the polyamide of the shell in an alcohol-based solvent and then precipitation of the polyamide of the shell around the core of the particle.

The present invention also relates to the use of a polyamide powder as defined above in composites, substrate coatings, transfer papers or for manufacturing cosmetic compositions.

The present invention also relates to the use of a polyamide powder as defined above for manufacturing objects by agglomeration of said powder by melting brought about by radiation chosen from a laser beam, infrared radiation or UV radiation.

The present invention also relates to the use of a polyamide powder as defined above in an additive manufacturing process for reducing the phenomenon of agglomeration of powder on the surface of the object.

The present invention also relates to a process for manufacturing an object by agglomeration of a polyamide powder as defined above, during which:
a. a thin layer of powder (layer 1) is deposited on a horizontal plate maintained in a chamber heated to a temperature lying between the crystallization temperature (Tc) and the melting temperature (Tm) of said powder,
b. a laser or an input of electromagnetic energy causes the agglomeration of the particles by melting at various points in the powder layer (layer 1) according to a geometry corresponding to the object to be manufactured, c. the horizontal plate is then lowered by a value corresponding to the thickness of one powder layer and then a new powder layer is deposited (layer 2), d. the laser or an input of electromagnetic energy causes the agglomeration of the particles by melting of the powder layer (layer 2) according to a geometry corresponding to this new slice of the object to be manufactured, e. the previous steps are repeated until the object is constructed;

f. an object surrounded by powder is obtained inside the chamber;

g. after complete cooling, the object is separated from the powder, which can be reused for another operation.

DETAILED DESCRIPTION OF THE INVENTION

Definitions

The term "3D printing" or "additive manufacturing", within the meaning of the invention, is understood to mean any process for the mass manufacturing of parts by addition or agglomeration of powder, layer by layer. Within the meaning of the invention, the term "3D printing" or "additive manufacturing" is also understood to mean selective sintering technologies using an absorber, in particular the technologies known under the names "High Speed Sintering" (HSS) and "Multi-Jet Fusion" (MJF).

In the present description, the term "sintering" includes all these processes, whatever the type of radiation. Even if, in the text which follows, reference is usually made to the selective laser sintering process, that which is written for this process is, of course, valid for the other manufacturing processes.

In the present description of the invention, including in the examples below, the D50 of a powder, also referred to as "volume-median diameter", corresponds to the value of the particle size which divides the population examined exactly in two. The D50 can be measured according to the standard ISO 9276-parts 1 to 6:

"Representation of results of particle size analysis" or according to the standard ISO 13319. Preferably, according to the standard ISO 13319:2007. In the present description, a Multisizer 3 Coulter Counter particle sizer from Beckman Coulter is used to obtain the particle size distribution of the powder and to deduce the D50 therefrom.

The inherent viscosity in solution (in particular of the polyamide, of the powders or of the parts manufactured by sintering) is measured according to the standard ISO 307:2007 at a concentration of 0.5% by weight in solution in m-cresol relative to the total weight of the solution, at a temperature of 20° C., using an Ubbelohde viscometer.

The analysis of the thermal characteristics of the polyamide is made by DSC according to the standard ISO 11357-3 "Plastics—Differential Scanning calorimetry (DSC) Part 3: Determination of temperature and enthalpy of melting and crystallization". The temperatures that more particularly concern the invention herein are the first-heating melting temperature and enthalpy of fusion (Tm1, ΔHf1), and the crystallization temperature (Tc). Preferably, a high enthalpy of fusion makes it possible to obtain a better geometric definition of the parts manufactured by the additive manufacturing process.

The term "caking" is understood to refer to the phenomenon of agglomeration of the powders which manifests in the presence of unwanted powder agglomerates at certain locations on the surface of the object instead of having a good definition of the final object. This phenomenon is observed when the transformation temperature in the machine comes too close to the melting temperature (Tm) of the powder.

Polyamide Powder Particles

A subject of the invention is a seeded polyamide (PA) powder consisting of a shell made of polyamide and a core made of polyamide, the core and the shell either being of an identical kind of polyamide but with different weight-average molar masses (Mw) or being of different kinds of polyamide.

According to one embodiment, the polyamide (PA) is an aliphatic polyamide or an aliphatic copolyamide.

Preferably, the shell and the core are made of polyamide selected from the group consisting of PA4, PA6, PA8, PA11, PA12, PA6/12, PA6.12, PA6.13, PA6.10, PA6.6 and PA10.10.

Preferably, the shell and the core of the particle according to the invention are as follows:
shell and core made of PA6, or
shell and core made of PA12, or
shell and core made of PA6/12.

Likewise preferably, the shell and the core are of different kinds of polyamide. Preferably, the shell and the core of the particle according to the invention are as follows:
shell made of PA6 and a core chosen from PA8, PA11, PA12, PA6/12, PA6.12, PA6.10, PA10.10; or
shell made of PA12 and a core chosen from PA6/12, PA6.12; or
shell made of PA6/12 and a core chosen from PA11, PA12, PA6.12, PA10.10, PA6.10.

Preferably, the core has a volume-median diameter (x) of between 15 and 60 μm. According to embodiments, the core has a volume-median diameter (x) of between 15 and 20 μm, or between 20 and 25 μm, or between 25 and 30 μm, or between 30 μm, or between 30 and 35 μm, or between 35 and 40 μm, or between 40 and 45 μm, or between 45 and 50 μm, or between 50 and 55 μm, or between 55 and 60 μm.

Preferably, the shell has a thickness (y) of between 1 and 15 μm.

Preferably, the powder particle according to the invention has a volume-median diameter (x+2*y) of between 17 and 90 μm, more preferably between 35 and 55 μm.

Preferably, the shell has a melting temperature of greater than 180° C., preferably within the range from 183° C. to 185° C.

Preferably, the shell has an inherent viscosity of between 1.20 and 1.50, preferably between 1.35 and 1.45.

Preferably, the core has a melting temperature of greater than 140° C., preferably between 175° C. and 180° C.

Preferably, the core has an inherent viscosity of between 0.30 and 1.30, preferably between 0.75 and 1.05.

Preferably, the powder particles according to the invention have a melting temperature of greater than 180° C.

Preferably, the powder particles according to the invention have an inherent viscosity of between 1.20 and 1.35.

Advantageously, the polyamide powders according to the invention facilitate and reduce the time for cleaning objects constructed by an additive manufacturing process. Likewise advantageously, the polyamide powders according to the invention reduce the risk of breakage when cleaning objects having very fine geometries.

Process for Producing a Polyamide Powder Particle

In one embodiment of the invention, the powder particles according to the invention are prepared by dissolution of the polyamide of the shell in an alcohol-based solvent and then precipitation of the polyamide of the shell around the core of the particle. The dissolution is preferably carried out under pressure and/or with heating. Likewise preferably, the dissolution is carried out in the presence of the core of the particle in suspension in said solvent. Preferably, the precipitation is carried out by reduction of temperature and/or extraction of solvent.

A subject of the invention is also a process for producing a powder by anionic polymerization in solution in a solvent.

A. Ingredients of the Polymerization

Monomers

Preferably, the polymerization is carried out in the presence of a lauryllactam (lactam 12), caprolactam (lactam 6), 2-pyrrolidone (lactam 4), or 2-azacyclononanone (lactam 8) monomer, or a mixture thereof, in solution in a solvent of the lactam or of the mixture in the presence of seeds (or organic filler) which are particles of powder of PA4, PA6, PA8, PA11, PA12, PA6/12, PA6.12, PA6.13, PA6.10, PA6.6 and PA10.10 and of a catalyst, of an activator and of at least one amide chosen from N,N'-alkylenebisamides.

Solvent

The solvent used dissolves the monomer but not the polymer particles which form during the polymerization. Advantageously, the solvent is a paraffinic hydrocarbon fraction having a boiling range of between 120 and 170° C., preferably between 140 and 170° C.

The solvent can be supersaturated with monomer at the polymerization temperature. Various means make it possible for the solvent to be supersaturated with monomer. One of these means may consist in saturating the solvent with monomer at a temperature above the initiation temperature, and then lowering the temperature down to the initiation temperature. Another means may consist in substantially saturating the solvent with monomer at the initiation temperature, and then adding, still at this temperature, a primary amide preferably containing from 12 to 22 carbon atoms, such as for example oleamide, N-stearamide, erucamide, isostearamide or else an N,N'-alkylenebisamide, examples of which are given below.

It is also possible to perform the polymerization in a solvent that is not saturated with monomer. In this case, the reaction medium contains the monomer dissolved in the solvent at a concentration which is far from supersaturation at the initiation temperature.

Catalyst

Preferably, use is made of a catalyst chosen from the usual catalysts for the anionic polymerization of lactams. This is a base which is sufficiently strong to result in a lactamate after reaction with the lactam. A combination of a plurality of catalysts is possible. By way of nonlimiting examples, mention may be made of sodium hydride, potassium hydride, sodium, sodium methoxide and/or ethoxide.

The amount of catalyst(s) introduced can generally vary between 0.5 and 3 mol per 100 mol of monomer.

Activator

An activator is preferably also added, having the role of bringing about and/or accelerating the polymerization. The activator is chosen from lactam-N-carboxyanilides, (mono) isocyanates, polyisocyanates, carbodiimides, cyanamides, acyllactams and acylcarbamates, triazines, ureas, N-substituted imides, esters and phosphorus trichloride. It may optionally also be a mixture of a plurality of activators. The activator may also optionally be formed in situ, for example, by reaction of an alkyl isocyanate with the lactam to give an acyllactam.

Preferably, the catalyst/activator molar ratio is between 0.2 and 2, preferably between 0.8 and 1.2.

Amide

Preferably, at least one amide is also added, one of these always being an N,N'-alkylenebisamide. The amount of N,N'-alkylenebisamide introduced is generally of the order of from 0.001 to 4 mol, preferably from 0.075 to 2 mol, per 100 mol of monomer. Among the N,N'-alkylenebisamides particularly recommended, mention may be made of the N,N'-alkylenebisamides of fatty acids, and better still of:

N,N'-ethylenebisstearamide of formula $C_{17}H_{35}$—C(=O)—NH—$CH_2CH_2$—NH—C(=O)—$C_{17}H_{35}$, abbreviated to EBS; and N,N'-ethylenebisoleamide of formula $C_{17}H_{33}$—C(=O)—NH—$CH_2CH_2$—NH—C(=O)—$C_{17}H_{33}$, abbreviated to EBO.

N,N'-alkylenebispalmitamide, N,N'-alkylenebisgadoleamide, N,N'-alkylenebiscetoleamide, and N,N'-alkylenebiserucamide.

Preference is given to using EBS and/or EBO.

It is also possible to add a primary amide preferably containing from 12 to 22 carbon atoms. This amide is preferably chosen from: oleamide, N-stearamide, isostearamide, erucamide.

Organic Filler

As regards the organic filler, this preferably concerns homopolyamide or copolyamide powders, preferably of PA4, PA6, PA8, PA11, PA12, PA6/12, PA 6.12, PA6.13, PA6.10, PA 6.6 and PA10.10. By way of example, mention may be made of the Orgasol® powders from Arkema, the Rilsan® fine powders from Arkema, the Vestosint® powders from Evonik, the MICROPAN® powders from Chemopharma, etc.

The polyamide powders are preferably finely divided.

The amount of organic filler and the diameter of said fillers make it possible to guide the size of the final particles obtained at the end of the polymerization in the desired direction (small particles or large particles).

Other Fillers or Additives

It is also possible to add to the reaction medium any kind of fillers well known to those skilled in the art (pigments, dyes, carbon black, carbon nanotubes, etc.) or additives (antioxidants, anti-UV agents, plasticizers, etc.), provided that all of these compounds are thoroughly dry and inert with respect to the reaction medium.

B. Polymerization

The anionic lactam ring-opening polymerization is conducted continuously or else, preferably, batchwise. The solvent is introduced in batches and then the monomer(s), optionally an N,N'-alkylenebisamide, the filler, the catalyst and the activator are introduced simultaneously or successively. It is recommended to first introduce the solvent and the monomer(s) and then to remove all traces of water, for example using an azeotropic distillation, before adding the catalyst once the medium is anhydrous. The filler can be introduced for example after introduction of the monomer(s). It may be advantageous, for avoiding solidification ora loss of control of the polymerization, to introduce the activator not all at once but in increments, or else at a given introduction rate.

The polymerization is carried out at atmospheric pressure or else under a slightly higher pressure (partial pressure of the hot solvent) and at a temperature of between 20° C. and the boiling temperature of the solvent. The initiation temperature and the temperature for polymerization of the lactams is generally between 70 and 150° C., preferably between 80 and 130° C. Advantageously, the temperature for polymerization of the lactams is less than 120° C. and greater than 70° C.

The [organic filler/monomer(s) introduced into the reaction medium] weight ratio, expressed in %, is between 0.001% and 65%, preferably between 0.005% and 45%, even more preferentially between 0.01% and 30%, and advantageously between 0.05% and 20%.

Preferably, the seeded powder obtained at the end of the polymerization is insoluble in the solvent of the monomer introduced beforehand into the reaction medium.

Use of the Polyamide Powder Particles

Preferably, the polyamide powder according to the invention is used in a process for manufacturing objects by agglomeration of powder by melting using radiation or a sintering process. The radiation can be chosen from any radiation well known to those skilled in the art. By way of example of radiation, mention may be made of a laser beam (laser sintering), infrared radiation, UV radiation, or any source of electromagnetic radiation which makes it possible to melt the powder layer by layer in order to manufacture three-dimensional objects.

The device used can be any sintering device well known to those skilled in the art. By way of example, it is possible to mention the sintering devices sold by EOS, 3D Systems, Aspect, Trump Precision Machinery, Hewlett Packard, Sinterit, Sintratec, Sharebot, FormLabs, Sonda Sys, Farsoon, Prodways, Ricoh, Wematter3D, VoxelJet, Xaar, etc. By way of example of sintering devices, it is possible to mention EOSINT P396 and Formiga P100 from EOS GmbH.

The object manufactured by agglomeration of the powder according to the invention is preferably a 3D object. Preferably, this object is chosen from a prototype, a part model ("rapid prototyping"), a small-series finished part ("rapid manufacturing") for automobile, nautical, aeronautical, aerospace, medical (prostheses, hearing systems, and the like), textile, clothing, fashion and decorative fields, the field of housings for electronics, telephony, home automation, computing, lighting, sport, and industrial tools.

Advantageously, the use of the polyamide powder according to the invention in the 3D printing process makes it possible to reduce the phenomenon of agglomeration of the powder at the surface of the 3D object. The use of the powder according to the invention in additive manufacturing is particularly advantageous since it makes it possible to facilitate and/or reduce the time for cleaning the objects obtained by this technology.

The use of the powder according to the invention in additive manufacturing is particularly advantageous since it can be recycled multiple times, alone or in a mixture. Specifically, the powder which has not been transformed can be recovered by screening, the screen thus retaining the 3D parts and allowing the powder to flow through. Preferably, the powder according to the invention can be recycled at least 3 times, preferably at least 5 times and more preferably at least 10 times.

Preferably, in each construction cycle, or "run", the content of recycled powder is at least 50%, preferably at least 60%, more preferably at least 70%, by weight, relative to the total weight of powder used in the machine on each run. In other words, apart from the first run which uses 100% of fresh powder, each following run reuses at least 50%, preferably at least 60%, preferably at least 70%, by weight of powder from the preceding run which has not been sintered, relative to the total weight of powder used in the machine on each run.

Before being used, the object can be easily cleaned using any cleaning technique well known to those skilled in the art. For example, the object can be cleaned using a sandblaster.

Non-limiting examples of the invention are given below.

DESCRIPTION OF THE FIGURE

FIG. 1 shows 4 parts constructed by a selective laser sintering (SLS) process, each having 10 holes of different sizes. The cleaning properties of the parts were studied using a compressed air blower without sandblasting. A score out of 10 is awarded according to the number of holes unblocked. The first part from the top has a score of 0/10. The second part from the top has a score of 6/10. The third part from the top has a score of 8/10. The fourth part from the top has a score of 10/10.

EXAMPLES

The inventors studied the phenomenon of agglomeration of the powders (caking) which manifests in the presence of powder agglomerates at certain locations on the surface of the 3D object manufactured by an additive manufacturing process.

1. Preparation of Polyamide Powder According to the Invention

1.1. Preparation of PA 12-Seeded PA 12 Powder

A reactor maintained under nitrogen is charged with 2800 ml of solvent, then successively 716 g of lactam 12, 8.2 g of EBS and 203 g of Orgasol® 2002 ES3 Nat 3 (PA12 powder). After having started the stirring at 350 rpm, the mixture is gradually heated up to 110° C. and then 360 ml of solvent are distilled off under vacuum in order to azeotropically entrain any trace of water which might be present.

After returning to atmospheric pressure, the anionic catalyst, 2.9 g of sodium hydride at 60% purity in oil, is rapidly introduced under nitrogen and the stirring is increased to 400 rpm, under nitrogen at 105° C. for 30 minutes.

A small metering pump is used to continuously inject, into the reaction medium, the chosen activator, that is to say stearyl isocyanate (12.2 g made up to 189.6 g with solvent) according to the following program:
  11 g/h of isocyanate solution for 180 minutes,
  45 g/h of isocyanate solution for 210 minutes.

At the same time, the temperature is maintained at 105° C. for 360 minutes during the injection and is then raised to 130° C. in 30 minutes and maintained at this temperature for 3 hours after the introduction of the isocyanate has ended.

At the end of polymerization, the polyamide powder is in dispersion in the synthesis solvent. The reaction medium is cooled down to 80° C. in order to be able to empty the reactor: after solid/liquid separation, the polyamide powder is placed in an oven at 75° C. in order to dry it of the solvent.

1.2. Properties of the Powder

1.2.1 Measurement Method

The D50 is measured according to the standard ISO 13319.

The inherent viscosity is measured according to the standard ISO 307:2007 at a concentration of 0.5% by weight in solution in meta-cresol relative to the total weight of the solution, at a temperature of 20° C.

The melting temperature and the enthalpy of fusion are measured by DSC according to the standard ISO 11357-3

"Plastics—Differential Scanning calorimetry (DSC) Part 3: Determination of temperature and enthalpy of melting and crystallization".

1.2.2. Results

The core/shell-type polyamide powder particles obtained have a volume-median diameter of 43.1 µm, an inherent viscosity of 1.27, a melting temperature of 184° C. and an enthalpy of fusion of 115 J/g.

The core has a volume-median diameter D50 of 30 µm, an inherent viscosity of 1.02 and a melting temperature of 177° C.

The shell has a thickness of 6.5 µm, and the synthesis parameters have been chosen aiming for an inherent viscosity of 1.40 and a melting temperature of 184° C.

2. Comparative Example

2.1. Comparative Example 1: PA 12 Powder (PA 2200, Product Sold by EOS)

The PA 2200 powder particles have a volume-median diameter of 52.7 µm, an inherent viscosity of 1.00, a melting temperature of 186° C. and an enthalpy of fusion of 125 J/g.

2.2. Comparative Example 2: Silica-Seeded PA 12 Powder

The PA 12 powder particles according to example 2 of the patent FR2867190 have a volume-median diameter of 51 µm without agglomerate, an inherent viscosity of 1.12, a melting temperature of 184° C. and an enthalpy of fusion of 118 J/g.

3. Evaluation of the Agglomeration of the Powders

3.1. Procedure

In order to evaluate the phenomenon of agglomeration of the powders by melting, parts having 10 holes of different sizes, particularly sensitive to caking, were constructed by a selective laser sintering (SLS) process using powder particles according to the invention and powders according to comparative examples 1 and 2.

The cleaning properties of the parts were studied using a compressed air blower without sandblasting. The greater the number of unblocked holes in the part, the easier the cleaning will be. A score out of 10 is awarded according to the number of holes unblocked. FIG. 1 shows parts having 10 holes of different sizes and examples of scores which may be awarded according to the number of holes unblocked. A score of 10/10 is awarded to powders which will be the easiest to clean and conversely a score of 0/10 is awarded to powders which agglomerate strongly and which will be the most difficult to clean (causing a longer cleaning time and possibly leading to degradation of certain fine and/or fragile elements of the 3D parts constructed).

3.2. Transformation Conditions

The laser conditions used for this test are the conditions recommended for the PA 12 powder (PA2200):

TABLE 1

| Temperature of the exposure chamber | 172° C. |
| Temperature of the shrinkage chamber | 140° C. |

TABLE 1-continued

| Contour | Laser power | 16 W |
| | Speed | 1500 mm/s |
| Hatching | Laser power | 18 W |
| | Speed | 3000 mm/s |
| | Beam offset | 0.20 mm |
| | Energy | 0.3 mJ/mm³ |

3.3. Results

Under the same operating conditions in a laser sintering (LS) machine:

The powder according to the invention obtained a score of 8/10 because 8 holes out of 10 are unblocked;

The PA 2200 powder (comparative example 1) obtained a score of 7/10 because 7 holes out of 10 are unblocked;

The silica-seeded PA12 powder (comparative example 2) obtained a score of 0/10 because the holes in the part are not unblocked during cleaning.

Consequently, the powder according to the present invention is less prone to the formation of unwanted powder agglomerates compared to conventional polyamide powders. This is linked to the fact that the powders according to the invention form fewer powder agglomerates on the surface of the manufactured objects. The objects thus have a better final definition and are easier to clean than the objects manufactured from conventional powders.

The invention claimed is:

1. A seeded particle of polyamide (PA) powder consisting of:
    a polyamide core with a volume-median diameter D50 within the range from 15 to 60 µm, and
    a polyamide shell,
    wherein the shell has an inherent viscosity in solution and a melting temperature which are respectively higher than those of the core.

2. The particle as claimed in claim 1, wherein the shell and the core of the particle are made of polyamide selected from the group consisting of PA4, PA6, PA8, PA11, PA12, PA6/12, PA6.12, PA6.13, PA6.10, PA6.6 and PA10.10.

3. The particle as claimed in claim 1, wherein the shell and the core of the particle are of the same nature:
    shell and core made of PA6, or
    shell and core made of PA12, or
    shell and core made of PA6/12.

4. The particle as claimed in claim 1, wherein the shell and the core of the particle are of different nature:
    shell made of PA6 and a core chosen from PA8, PA11, PA12, PA6/12, PA6.12, PA6.10, PA10.10; or
    shell made of PA12 and a core chosen from PA6/12, PA6.12; or
    shell made of PA6/12 and a core chosen from PA11, PA12, PA6.12, PA10.10 and PA6.10.

5. The particle as claimed in claim 1, wherein the shell has an inherent viscosity in solution within the range from 1.20 to 1.50.

6. The particle as claimed in claim 1, wherein the shell has a melting temperature (Tm1) of greater than 180° C.

7. The particle as claimed in claim 1, where the shell is obtained by anionic polymerization.

8. The particle as claimed in claim 1, wherein the shell is obtained by dissolution and precipitation of polyamide around the core of the particle.

9. The particle as claimed in claim 1, wherein the particle has a volume-median diameter D50 within the range from 17 to 90 µm.

10. A process for producing the particle as claimed in claim 1 by anionic polymerization in solution in a solvent, comprising the polymerization of the shell from 2-pyrrolidone, from caprolactam, from lauryllactam, from 2-azacyclononanone or from a mixture thereof in the presence of a catalyst, of an activator, of at least one amide chosen from N,N'-alkylenebisamides and of an organic filler for the core of the particle selected from the group consisting of PA4, PA6, PA8, PA11, PA12, PA6/12, PA6.12, PA6.13, PA6.10, PA6.6 and PA10.10.

11. The process as claimed in claim 10, wherein the N,N'-alkylenebisamide is chosen from EBS and EBO.

12. The process as claimed in claim 10, wherein, in addition to the N,N'-alkylenebisamide, there is a further amide chosen from oleamide, N-stearamide, isostearamide and erucamide.

13. A process for producing a powder particle as claimed in claim 1, by dissolution of the polyamide of the shell in an alcohol-based solvent and then precipitation of the polyamide of the shell around the core of the particle.

14. The process as claimed in claim 13, wherein the dissolution is carried out under pressure and/or with heating.

15. The process as claimed in claim 13, wherein the dissolution is carried out in the presence of the core of the particle in suspension in said solvent.

16. The process as claimed in claim 13, wherein the precipitation is carried out by reduction of temperature and/or extraction of solvent.

17. A process for manufacturing an object by agglomeration of the powder as claimed in claim 1, during which:
  a. a thin layer of powder (layer 1) is deposited on a horizontal plate maintained in a chamber heated to a temperature lying between the crystallization temperature (Tc) and the melting temperature (Tm) of said powder,
  b. a laser or an input of electromagnetic energy causes the agglomeration of the particles by melting at various points in the powder layer (layer 1) according to a geometry corresponding to the object to be manufactured,
  c. the horizontal plate is then lowered by a value corresponding to the thickness of one powder layer and then a new powder layer is deposited (layer 2),
  d. the laser or an input of electromagnetic energy causes the agglomeration of the particles by melting of the powder layer (layer 2) according to a geometry corresponding to this new slice of the object to be manufactured,
  e. the previous steps are repeated until the object is constructed;
  f. an object surrounded by powder is obtained inside the chamber;
  g. after complete cooling, the object is separated from the powder, which can be reused for another operation.

18. The particle as claimed in claim 1, wherein the shell has a thickness of between 1 and 15 μm.

19. The particle as claimed in claim 1, wherein the particle is formed by anionic polymerization in solution in a solvent, comprising the polymerization of the shell from 2-pyrrolidone, from caprolactam, from lauryllactam, from 2-azacyclononanone or from a mixture thereof in the presence of a catalyst, of an activator, of at least one amide chosen from N,N'-alkylenebisamides and of an organic filler for the core of the particle selected from the group consisting of PA4, PA6, PA8, PA11, PA12, PA6/12, PA6.12, PA6.13, PA6.10, PA6.6 and PA10.10.

20. The particle as claimed in claim 19, wherein the N,N'-alkylenebisamide is chosen from EBS and EBO.

21. The particle as claimed in claim 19, wherein, in addition to the N,N'-alkylenebisamide, there is a further amide chosen from oleamide, N-stearamide, isostearamide and erucamide.

* * * * *